United States Patent
Yu et al.

[11] Patent Number: 6,085,585
[45] Date of Patent: Jul. 11, 2000

[54] SPRINKLER PERFORMANCE EVALUATION SYSTEM

[75] Inventors: Hong-Zeng Yu, Foxboro; Tak-Sang Chan, Sharon; Hsiang-Cheng Kung, Weston, all of Mass.; William R. Brown, Northfield, N.H.; Paraskevas Stavrianidis, Sharon, Mass.

[73] Assignee: Factory Mutual Research Corporation, Norwood, Mass.

[21] Appl. No.: 09/293,882

[22] Filed: Apr. 19, 1999

[51] Int. Cl.[7] .......................... G01M 19/00; G09B 19/00
[52] U.S. Cl. .............................. 73/168; 434/226
[58] Field of Search ........................ 73/168, 290 R; 169/37, 64; 434/226 R, 219

[56] References Cited

U.S. PATENT DOCUMENTS

| | | |
|---|---|---|
| 3,227,219 | 1/1966 | Boyer et al. . |
| 3,675,342 | 7/1972 | Wolff . |
| 3,675,343 | 7/1972 | Swiatosz et al. . |
| 4,526,548 | 7/1985 | Livingston . |
| 4,861,270 | 8/1989 | Ernst et al. . |
| 5,226,818 | 7/1993 | Feiock et al. . |
| 5,233,869 | 8/1993 | Rogers et al. . |
| 5,320,138 | 6/1994 | Ferlitch, Jr. . |
| 5,335,559 | 8/1994 | Rogers et al. . |
| 5,345,830 | 9/1994 | Rogers et al. . |
| 5,509,807 | 4/1996 | Joice et al. . |
| 5,680,329 | 10/1997 | Lloyd et al. . |

*Primary Examiner*—Harshad Patel
*Assistant Examiner*—Robin Clark
*Attorney, Agent, or Firm*—Lane, Aitken & McCann

[57] ABSTRACT

In a sprinkler effectiveness testing system, a fire plume to simulate a burning warehouse commodity storage array is generated. The sprinkler system to be tested is suspended from an adjustable ceiling. Thermocouples measure the temperature of the fire gases under and adjacent to the ceiling. Collection pans are positioned to collect sprinkler water passing through the plume and to separately collect the sprinkler water passing around the plume.

20 Claims, 3 Drawing Sheets

SPRINKLER PERFORMANCE EVALUATION SYSTEM

This invention relates to a system for testing the effectiveness of a sprinkler system for protecting warehouses from fire.

BACKGROUND OF THE INVENTION

Prior to the present invention, the effectiveness of sprinkler systems in protecting against fire loss has been traditionally carried out by conducting full scale fire tests in which large quantities of real warehouse commodities are arranged in the same manner that they are stored in the warehouse and are ignited with the sprinkler system to be tested in place over the commodities. Since large quantities of real commodities are used for the test, the testing is quite an expensive process. As a result, there is a need for a system and method which will test the effectiveness of sprinkler systems in a more cost effective manner.

SUMMARY OF THE INVENTION

The effectiveness of a sprinkler system for warehouse fire protection can be determined by three parameters: 1) the actual water density (ADD) delivered by the sprinkler system through the fire plume to the top of the storage stacks which have been ignited; 2) the prewetting density (PWD) on the commodity stacks adjacent to the ignited stacks; and 3) the cooling of the fire gases above the ignited stacks. The actual water density delivered through the fire plume correlates with the effectiveness of the sprinkler system in the suppression or extinguishment of the fire. The prewetting density on the stacks adjacent to the ignition stacks correlates with the effectiveness of the sprinkler system in confining the fire within its origin. The degree of cooling of the fire gases correlates with the effectiveness of the sprinkler system in preventing an excessive number of sprinklers in the sprinkler system from being actuated. Since the above three described parameters are determined by the interaction of the fire plume and the sprinkler water spray, these parameters can be measured without conducting a full scale fire test if the fire plume is closely simulated in its temperature and velocity field and the amount of water provided by the system is collected and measured over an area which conforms to the cross-section of the storage arrangement in the warehouse.

The present invention is designed to make an accurate measurement of the above three mentioned parameters which determine the effectiveness of a sprinkler system in protecting against fire loss. A fire plume generator is located above the floor at a convenient height to reproduce the fire plume of a burning commodity stack and water collection pans are positioned beneath the fire plume generator and located to collect the water passing through the fire plume and separately collect water in the areas adjacent to the fire plume. The sprinkler system to be tested is suspended from a ceiling or otherwise positioned beneath the ceiling in a normal location for a sprinkler system in a warehouse relative to the ceiling. The height of the ceiling is adjustable. The water collected by the pans positioned to collect the water passing through the fire plume provides a measurement of the ADD, the actual water density delivered by the sprinklers through the fire plume to the put out the fire in the burning storage stacks (called ignition stacks). The pans positioned around the periphery of the plume provide a measurement of the PWD, the prewetting density on the stacks adjacent to the ignition stacks. In addition, pans are also provided in areas corresponding to flues between stacks. Water collected in each pan is channeled to a separate collection tank via a hose wherein the density (flux) of the water reaching each pan is measured.

DESCRIPTION OF A PREFERRED EMBODIMENT

Figure 1:
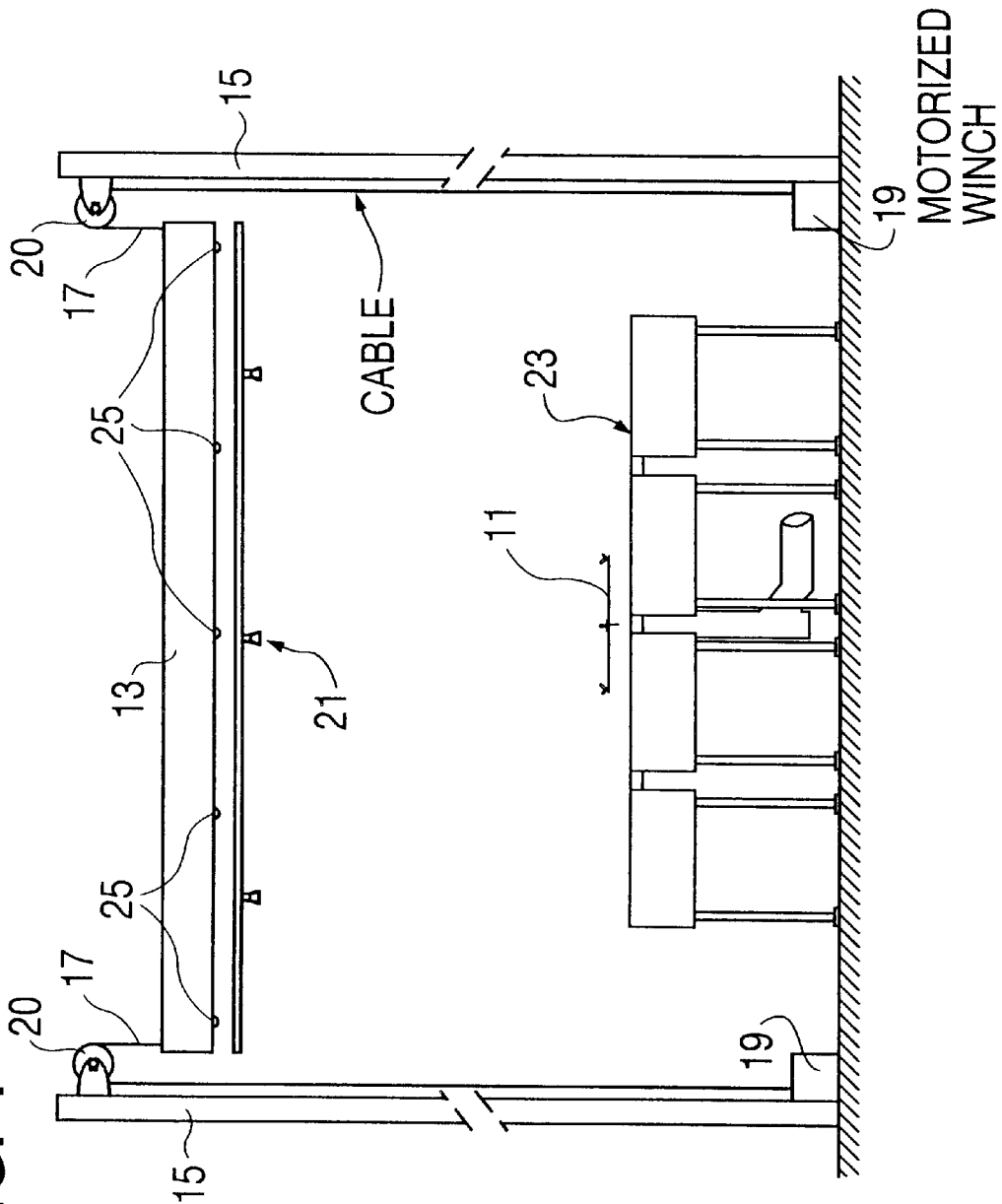
FIG. 1 is a schematic view in elevation of the system of the invention.

As shown in FIG. 1, the sprinkler performance of the evaluation system of the invention comprises a burner system 11 positioned at a convenient height above the building floor designed to produce a flame plume like that produced by a burning commodity stack in a warehouse. Positioned over the burner system 11 is a ceiling 13 which is supported at its four corners from steel beams 15 by means of cables 17 which are connected on pulleys 20 and connect to motorized winches 19 mounted at the bases of the four steel beams 15. By means of the winches 19, the vertical position of the ceiling 13 over the flame can be adjusted to different levels. The lower surface of the ceiling 13 is defined by refractory ceiling tiles which are supported on steel trusses. Suspended from the ceiling 13 is the sprinkler system 21 to be tested. Positioned about 6 inches beneath the burner system 11 is a pan collection system 23 containing a series of 42 pans, some of which are positioned directly under the fire plume generated by the burner system 11 to collect the water from the sprinkler system 21 passing through the fire plume and some of which are positioned around the periphery of the burner 11 to collect the water from the sprinkler system which would wet the areas around the fire plume. The pans positioned around the periphery of the burner collect water passing around the periphery of the plume and may collect some water which passes through the flame, since some of the sprinklers may be at some distance from the vertical center line of the plume and water drops entering the plume from one side may pass through the plume and land in pans on the other side of the plume.

Thermocouples 25 are deployed at strategic locations under and adjacent to the ceiling 13 to measure the fire gas temperature under and adjacent to the ceiling. To measure the effectiveness of the cooling of the sprinkler system, the temperature of the fire gases is measured after the fire plume has been ignited, but before the sprinkler system is activated and then it is measured again after the sprinkler system has been activated. The difference between the temperature measurements provides an indication of the effectiveness of the sprinkler system in cooling of the fire gases.

Figure 2:
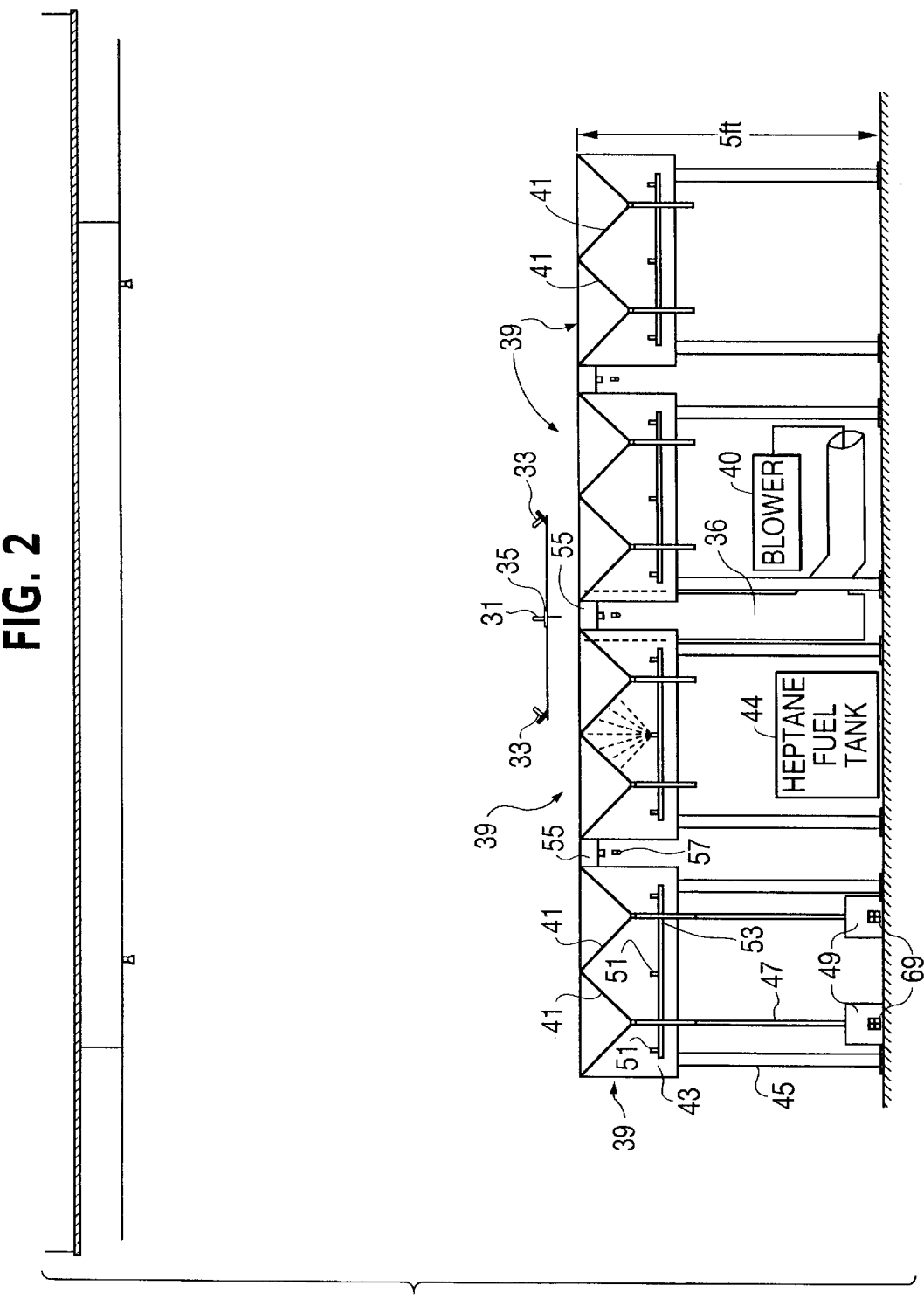
FIG. 2 is an enlarged schematic sectional view in elevation showing more details of the pan structure and nozzle structure.
Figure 3:
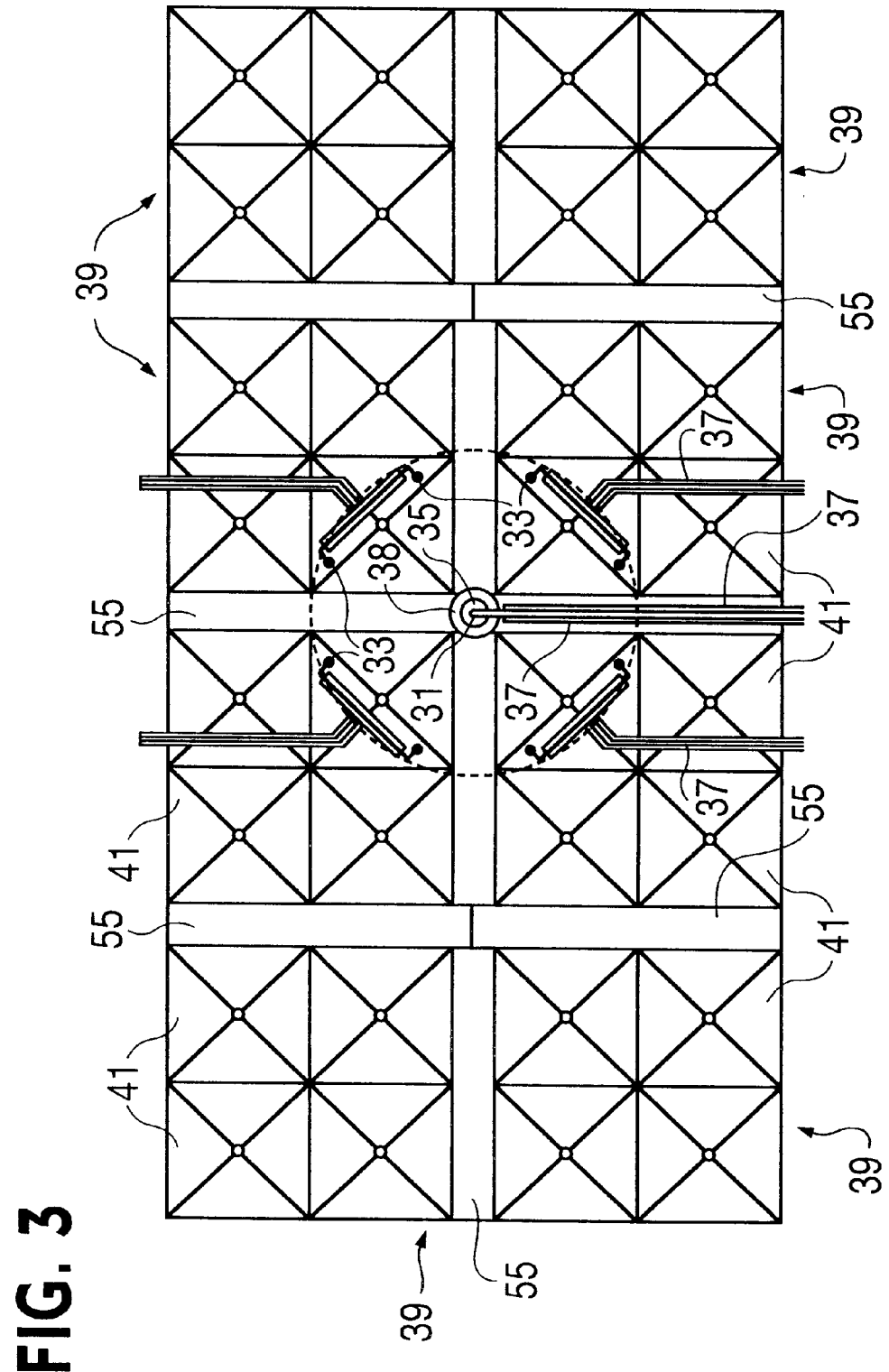
FIG. 3 is a top plan view of the collection pan system and the flame producing nozzles of the system of the invention.

As shown in FIGS. 2 and 3, the burner system comprises an array of nine nozzles comprising a vertical central nozzle 31 and eight nozzles 33 equally distributed around a four foot diameter circle. The nozzles 33 are angled inwardly at an angle to horizontal in the range of 55° to 70°. Beneath the central nozzle 31 is a 4 inch circular deflector plate 35 and beneath the deflector plate 35 is a duct 36 having an 8 inch opening 38 facing vertically upward and connected to receive air from a blower 40 so as to cause a vertical air flow of 650 cubic feet per minute directly beneath the deflector plate 35. The size of the deflector plate and its elevation above the duct opening 38 provides sustaining combustion from the central nozzle 31 and desirable air flow in the near field of the fire plume. The nozzles 31 and 33 are supplied with heptane fuel through copper tubes 37 which are protected from the heat of the fire plume by copper water jackets. The copper tubes leading to the nozzle are of equal length so that the same heptane discharge pressure is supplied to each nozzle. The outer nozzles 33 are arranged in pairs each supplied by one jacketed copper tube which leads to a point between the pair of nozzles and branches into two arms to feed each nozzle of the pair. The tubing is positioned above the collection pan system 23 and the copper water jacketing is needed to prevent the heptane from boiling by being heated by the fire gases generated and by radiation from the fire plume.

The pan collection system 23 comprises eight assemblies 39, each assembly 39 comprising four pans 41 each in the shape of an inverted pyramid and each of which has a square shape in top plan view. The pans 41 are supported in frames 43 which in turn are supported from the floor 44 of the testing system by legs 45. The lower ends of the pans 41 open to hoses 47 which channel the collected water to collection tanks 49. Thus, water received by each pan 41 will be collected in a corresponding collection tank 49. Nozzles 51 are provided in the frames 43 beneath the pans 41 and are connected to a pressurized water source by tubing 53. The nozzles 51 spray a fine water mist on the under sides of the pans 41 to reduce evaporation of the water collected by the pans 41 by the heat generated by the fire plume.

Each of the frames 43 corresponds to a warehouse stack and has a dimension of 42"×42" in plan view. Thus, the pans 41 each have a dimension in plan view of 21"×21". The frames 43 are separated by six inch gaps corresponding to vertical flues between storage stacks. Situated in the six inch gaps are trough shaped collection pans 55, each of which is also provided with a drain connected to a hose leading to a collection tank (not shown). The trough shaped collection pans 55 are cooled by fine water mist sprayed from nozzles 57. The trough shaped pans 55 are spaced from each other at the center of the pan collecting system to leave room for the upper end of the duct 36 and so as not to obstruct the opening 38.

The arrangement of the frames 43 with the collection pans 41 conforms to the horizontal cross section of a typical rack storage array, which is two pallet loads wide and four pallet loads deep with six inch wide vertical flues. Thus, each frame 43 corresponds to a pallet load.

Heptane under pressure is supplied to the fuel nozzles from a fuel tank 44 pressurized by nitrogen and the fuel issuing from the nozzles is ignited. Blower 58 provides air at 650 cubic feet per minute to the duct which provides a stream of vertically flowing air upwardly passing around the deflection plate 35. The resulting flame will simulate the fire plume generated by ignited four stacks of actual warehouse products. The nozzles 31 and 33 may have various capacities to provide different convective heat rates. In a specific embodiment, the nozzles are the PL and PPL series available from Monarch Manufacture Works, Inc., Philadelphia, Pa. These nozzles spray fuel at angles of 70° and 80°, respectively. Table I below shows different exemplary nozzle arrangements and fuel pressures to achieve different convective heat release rates.

TABLE I

| Convective Heat Release Rate (Btu/min) | Center Nozzle Model Series | Outside Nozzle Model Series | Outside Nozzle Angles Relative to Horizontal Plane | Heptane Supply Pressure (Psig) |
| --- | --- | --- | --- | --- |
| 28500 | PL - 4 | PL - 4 | 60 | 44 |
| 57000 | PL - 7.5 | PL - 7.5 | 60 | 55 |
| 85500 | PLP - 19.5 | PL - 7.5 | 70 | 85 |
| 114000 | PLP - 19.5 | PL - 15.5 | 55 | 52 |
| 142500 | PLP - 19.5 | PL - 15.5 | 65 | 79 |

The fire plume produced by the burner system 11 will trigger the sprinklers in the area over the flame plume and cause them to begin supplying water sprayed downward into the flame and around the flame. The water collected in the 16 centrally located pans 41 will have passed through the plume of the flame and, thus, the water collected by these pans beneath the flame plume will represent the ADD. The water collected by the 16 pans in the outer frames 43 will represent the water delivered to prewet the stacks around the ignited stacks and, thus, represent the PWD. The amount of water delivered to each collection pan flows to a corresponding collection tank 49. Each collection tank is instrumented with a pressure transducer 69 located near the bottom of the tank to measure the water level in the tank. The rate of water collected in each tank 49 represents the rate of water flow into the corresponding pan 41. Thus, the transducers 69 by measuring the change in water level can measure the ADD and PWD. Similarly, the tanks receiving the water collected by the pans 55 provide a measurement of the amount of water and rate of water delivered to the vertical flues between the stacks.

The novel design of the fire plume generator as described above is capable of reproducing fire plumes simulating actual rack storage fires in warehouses without burning real commodities.

Table II below shows a comparison of the centerline gas velocity and temperatures created above ambient by the system of the invention for different convective heat rates compared to actual data measured from actual fire plumes in real rack storage fires.

TABLE II

| Convective Heat Release Rate (Btu/min) | Elevation Above Water Collection Pans | | | | | |
| --- | --- | --- | --- | --- | --- | --- |
| | 3 ft. 5 in. | | 8 ft. 5 in. | | 15 ft. 5 in. | |
| | Temp.* (° F.) | Velocity* (Ft/s) | Temp.* (° F.) | Velocity* (Ft/s) | Temp.* (° F.) | Velocity* (Ft/s) |
| 28500 | 328 (594) | 24.9 (24.0) | 326 (292) | 22.0 (21.3) | 202 (169) | 19.4 (20.3) |

TABLE II-continued

| Convective Heat Release Rate (Btu/min) | Elevation Above Water Collection Pans | | | | | |
|---|---|---|---|---|---|---|
| | 3 ft. 5 in. | | 8 ft. 5 in. | | 15 ft. 5 in. | |
| | Temp.* (° F.) | Velocity* (Ft/s) | Temp.* (° F.) | Velocity* (Ft/s) | Temp.* (° F.) | Velocity* (Ft/s) |
| 57000 | 758 (1215) | 29.9 (31.5) | 677 (596) | 29.2 (28.2) | 365 (292) | 24.6 (25.0) |
| 85500 | 1426 (1523) | 34.1 (34.5) | 1001 (943) | 33.1 (31.2) | 493 (455) | 28.5 (29.8) |
| 114000 | 1612 (1604) | 34.5 (35.1) | 1368 (1301) | 38.7 (36.1) | 671 (639) | 32.5 (35.1) |
| 142500 | 1600 (1647) | 35.4 (35.4) | 1523 (1458) | 41.0 (34.5) | 769 (734) | 34.5 (36.1) |

*Numbers enclosed in parenthesis are fire plume data of actual double-row rack storage fires.

The deflection plate 31 at its elevation relative to the outlet opening from the duct through which 650 cfm of air is blown provides sustaining combustion close to the duct opening and closely reproduces gas velocities of rack storage fire plumes. The fire plume generator is positioned above the assembly of collection pans because this facilitates reconfiguration of the collection assembly with relative ease and makes the system more flexible. In addition, by positioning the fire plume generator above the collection pan assembly instead of below the collection pan assembly, the apparatus is made less massive because less protection of the apparatus from the fire temperature is needed and lower heptane consumption is required to produce the same heat release rate since there is no contact between the fire plume and the water collection pans.

The design of the collection pan system is intended to conform to the horizontal cross-section of rack storage arrays used in warehouses. As a result, the water distribution measurements directly represent the water sprinkler distribution that occurs in actual warehouse fires. The specific design shown in the drawings conforms to a storage stack configuration typically used in warehouses. The pan collection system is readily modified to conform to other warehouse storage configurations. The apparatus lends itself to being quickly assembled and disassembled because of the modular design of the water collection pans and the fire plume generator. This feature and the feature of the adjustable ceiling enable the same test site to be quickly and easily modified to represent different warehouse configurations as well as for other types of testing.

The measurements provided by the pressure transducers in the collection tanks 49 enables automation of the measurement of both the amount of water collection and the rate of water collection. Other electric signal generators may be used and also mechanical sensors, such as gauges or scales on the tanks could be used to provide the measurements. Alternatively, the sprayed water density (flux) passing through the plume and passing around the plume could be sensed directly with detectors designed to detect spray density (flux) where the pans are located.

The apparatus of the invention is simple in design and consists of no moving parts except for the suspended ceiling. As a result, the apparatus is very reliable, is easy to maintain and is of low cost.

The above description is of a preferred embodiment of the invention and modification may be made thereto without departing from the spirit and scope of the invention which is defined in the appended claims.

We claim:

1. A fire protection sprinkler effectiveness testing system comprising a burner system arranged to generate a fire plume simulating a fire plume that would be generated by a fire, at least one pan positioned beneath the plume generated by said burner system to collect water discharged by a sprinkler system being tested and passing through the generated plume, and means to measure the amount of water collected by said at least one pan.

2. A testing system as recited in claim 1, wherein a ceiling is positioned over said burner system.

3. A testing system as recited in claim 2, wherein the height of said ceiling over said burner system is adjustable.

4. A testing system as recited in claim 1, wherein a plurality of pans are provided, each being beneath the plume generated by said burner system in a different area and each arranged to collect water passing through the plume generate by said burner system and means to measure the amount of water collected by each of said pans.

5. A testing system as recited in claim 4, further comprising a second plurality of pans adjacent to the plume generated by said burner system spaced sufficiently from the plume generated by said burner system to collect water from said sprinkler system which would wet areas around the periphery of said plume, and means to detect the amount of water collected by each of said pans of said second set.

6. A testing system as recited in claim 5, wherein the pans of said first and second sets are arranged in a configuration to correspond to stacks of commodities in a warehouse.

7. A testing system as recited in claim 1, wherein means are provided to mount the sprinkler system to be tested over said burner system.

8. A testing system as recited in claim 7, further comprising a ceiling, said means to mount said sprinkler system to be tested comprising means to suspend said sprinkler system from said ceiling.

9. A testing system as recited in claim 1, wherein the means to measure the amount of water collected by said pan comprises a storage tank to store the water collected by said pan and means to indicate the amount of water stored in said storage tank.

10. A testing system as recited in claim 9, wherein said means to measure the amount of water in said tank comprises means to electrically detect the amount of water in said tank and generate a signal representing the amount of water in said tank.

11. A testing system as recited in claim 10, wherein said means to electrically detect the amount of water stored in said tank comprises a pressure sensitive detector sensing the water pressure in said tank.

12. A testing system as recited in claim 1, further comprising a second pan positioned adjacent to the plume generated by said burner system but spaced sufficiently away from said plume to collect water from the sprinkler system being tested which would wet areas around the periphery of said plane.

13. A testing system as recited in claim 1, wherein said burner system comprises an array of fuel nozzles and means to supply fuel to said fuel nozzles.

14. A testing system as recited in claim 13, wherein said array of fuel nozzles includes a central vertically arranged fuel nozzle, said testing system further comprising a blower arranged to blow a stream of air vertically upwardly around the central fuel nozzle of said array.

15. A testing system as recited in claim 14, wherein a deflector plate is arranged horizontally directly below said centrally positioned nozzle in the path of said steam of air.

16. A sprinkler effectiveness testing system comprising a burner system to generate a fire plume, a sprinkler system for discharging water from sprinkler heads mounted above said burner system, and a water measuring system arranged to measure the amount of water sprayed from said sprinkler system and passing through at least a portion of said plume.

17. A testing system as recited in claim 16, wherein a ceiling adjustable in height is positioned over said burner system and above said sprinkler system.

18. A testing system as recited in claim 16, wherein said water measuring system comprises at least one pan positioned beneath said burner system in a position to collect water from said sprinkler system passing through at least a portion of said plume.

19. A testing system as recited in claim 18, wherein said water measuring system measures an amount of water sprayed from said sprinkler system and passing through a space within or adjacent to said plume and comprises a second pan is displaced horizontally from said plume to collect water from said sprinkler system passing through space within or adjacent to said plume and which would wet areas around the periphery of said plume.

20. A sprinkler system as recited in claim 16, wherein said burner system comprises an array of nozzles including a centrally located nozzle, a deflector plate under said centrally located nozzle and a blower arranged to blow a stream of air up and around said deflector plate and said centrally located nozzle.

* * * * *